US007770812B2

(12) United States Patent
Sebastian

(10) Patent No.: US 7,770,812 B2
(45) Date of Patent: Aug. 10, 2010

(54) FUEL INJECTOR AND METHOD FOR ITS INSTALLATION

(75) Inventor: Thomas Sebastian, Charleston, SC (US)

(73) Assignee: Robert Bosch GmbH, Stuttgart (DE)

( * ) Notice: Subject to any disclaimer, the term of this patent is extended or adjusted under 35 U.S.C. 154(b) by 681 days.

(21) Appl. No.: 10/564,212

(22) PCT Filed: Jun. 19, 2004

(86) PCT No.: PCT/DE2004/001289

§ 371 (c)(1),
(2), (4) Date: Jun. 16, 2006

(87) PCT Pub. No.: WO2005/014999

PCT Pub. Date: Feb. 17, 2005

(65) Prior Publication Data

US 2007/0095745 A1 May 3, 2007

(30) Foreign Application Priority Data

Jul. 30, 2003 (DE) ................................ 103 34 785

(51) Int. Cl.

| | |
|---|---|
| ***F02D 1/06*** | (2006.01) |
| ***B05B 1/30*** | (2006.01) |
| ***B05B 1/00*** | (2006.01) |
| ***F23D 14/68*** | (2006.01) |
| ***B01D 35/02*** | (2006.01) |

(52) U.S. Cl. ........................ 239/5; 239/575; 239/585.1; 239/585.4; 239/590; 239/590.3; 239/600; 239/DIG. 23; 210/429

(58) Field of Classification Search .............. 239/585.1, 239/590, 600, DIG. 23, 5, 575, 585.4, 590.3; 210/429
See application file for complete search history.

(56) References Cited

U.S. PATENT DOCUMENTS

| | | | | |
|---|---|---|---|---|
| 3,779,268 | A * | 12/1973 | Conkling | 137/113 |
| 5,335,863 | A * | 8/1994 | DeGrace | 239/575 |
| 5,356,079 | A * | 10/1994 | Rahbar | 239/585.1 |
| 5,516,424 | A * | 5/1996 | Strohschein | 210/232 |
| 5,641,126 | A * | 6/1997 | Nally et al. | 239/575 |
| 6,446,885 | B1 * | 9/2002 | Sims et al. | 239/585.4 |
| 2003/0155447 | A1 | 8/2003 | Reiter | |

FOREIGN PATENT DOCUMENTS

| | | |
|---|---|---|
| DE | 43 25 842 | 2/1995 |
| DE | 694 06 783 | 4/1998 |
| EP | 1 128 059 | 8/2001 |
| JP | 62-267565 | 11/1987 |
| JP | 7-071346 | 3/1995 |
| JP | 2001-234833 | 8/2001 |

* cited by examiner

*Primary Examiner*—Dinh Q Nguyen
*Assistant Examiner*—Ryan Reis
(74) *Attorney, Agent, or Firm*—Kenyon & Kenyon LLP

(57) ABSTRACT

A fuel injector for fuel-injection systems of internal combustion engines includes a solenoid coil, a tubular support acting as inner pole of the solenoid coil, and a filter element, the filter element being press-fitted with an outer contour of the tubular support of the fuel injector.

10 Claims, 2 Drawing Sheets

FUEL INJECTOR AND METHOD FOR ITS INSTALLATION

FIELD OF THE INVENTION

The present invention relates to a fuel injector and a method for installing a fuel injector.

BACKGROUND INFORMATION

In known fuel injectors, fuel filters are pressed into a fuel-intake nipple and affixed therein by a brass ring. This manner of fastening, first of all, involves the risk of abrasion and the formation of chips, which can lead to malfunctions of the fuel injector. On the other hand, the use of expensive brass as a component material is a cost factor that considerably increases the cost of the fuel injector.

A fuel injector, in which a fuel filter is manufactured in one piece with a retaining collar, is described in German patent document DE 43 25 842. The retaining collar radially extends beyond the fuel intake nipple and has a lip outside the fuel intake nipple. The circumferential lip of the retaining collar, together with a groove on the outer circumference of the fuel intake nipple, forms a snap-in connection by which the fuel filter is fastened in a defined manner. Only a clearance fit exists between the base element of the fuel filter and the inner wall of the fuel intake nipple, so that any build-up of shavings in the interior of the fuel injector is prevented.

A particular disadvantage of the fuel injector described in German patent document DE 43 25 842 is the large amount of processing time spent in affixing the filter to either the adjusting sleeve or the fuel intake nipple. In addition, the filter and adjusting sleeve are made of different materials, whereby shavings and abrasion are formed at the contact surfaces, predominantly on the plastic of the filter, which can lead to malfunctions of the fuel injector due to the deposition of the particles.

SUMMARY

In contrast to the known art, the fuel injector according to the present invention and the method according to the present invention for installing a fuel injector provide the advantage of a quick and cost-effective production and installation, as well as a reliable fixation of the filter element in the fuel injector, without the risk of shavings.

This is achieved by press-fitting the filter element with an outer contour of a tubular support of the fuel injector.

The outer contour of the tubular support advantageously has grooves into which a fiber glass plastic extrusion coat of the filter element is press-fitted under pressure.

It is also advantageous that the grooves are able to be introduced in the tubular support in a simple manner by machine-cutting or with the aid of a structural steel.

It is also advantageous that the press-fitting of the filter element is implemented by the installation of an extension sleeve whose inner diameter is slightly smaller than an outer diameter of the filter element.

The filter element is advantageously able to be manufactured like conventional filter elements, in the shape of a cup and made from cloth material and a fiber glass plastic extrusion coat.

DETAILED DESCRIPTION

Figure 1A:
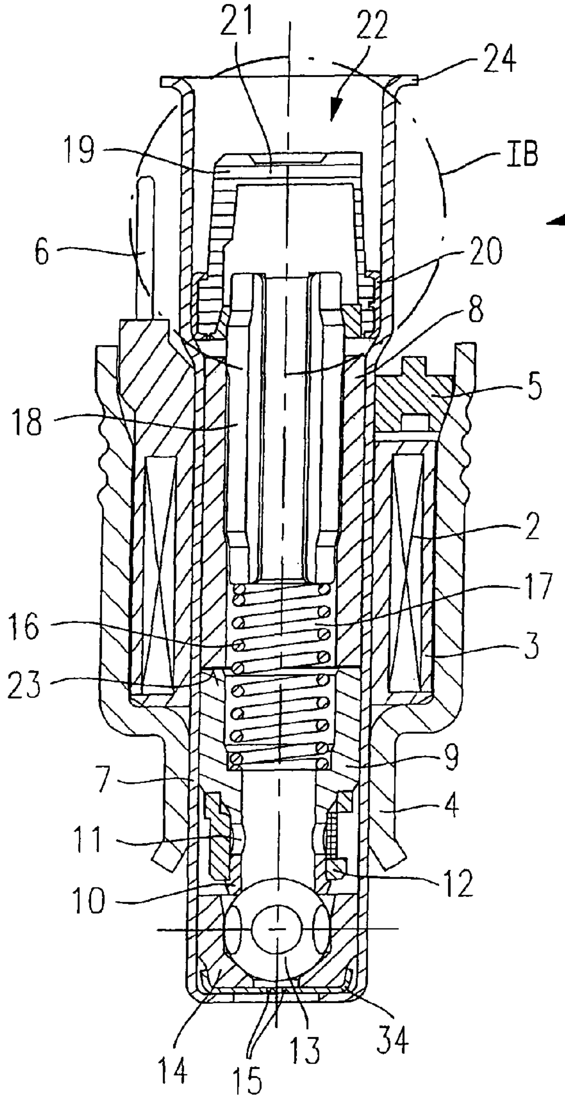
Fig. 1A Prior Art
FIG. 1A shows a schematic sectional view through an exemplary embodiment of a fuel injector according to the known art.

For a better understanding of the measures according to the present invention, FIG. 1A, first of all, shows a part-sectional, schematic representation of a longitudinal section through a fuel injector 1 according to the known art, which is suited, in particular, for the injection of fuel into an intake manifold (not shown further) of an internal combustion engine.

Fuel injector 1 includes a magnetic coil 2 which is wound on a coil brace 3. Coil brace 3 is encapsulated in a valve housing 4 and sealed off by a lid 5. A contact tag 6 is formed on coil brace 3.

Coil brace 3 is penetrated by a valve sleeve 7, which has a tubular design and includes a tubular support 8 wedged or soldered therein, which is used as inner pole of magnetic coil 2. Valve housing 4, for example, may be used as outer pole of magnetic coil 2. Downstream from tubular support 8 is an armature 9 which is designed in one piece with a valve needle 10. Flow-through orifices 11 are provided in valve needle 10, which guide the fuel flowing through fuel injector 1 toward a sealing seat.

An annular filter 12 for filtering the fuel may be disposed in the region of flow-through orifices 11. Valve needle 10 is in operative connection, e.g., by welding, with a valve-closure member 13 having a spherical shape in the exemplary embodiment, valve-closure member 13 forming a sealing seat together with a valve-seat body 14. Downstream from the sealing seat, at least one spray-discharge orifice 15 is formed in a spray-orifice plate 34, via which the fuel is injected into the intake manifold (not shown further).

In the rest state of fuel injector 1, armature 9 is acted upon by a restoring spring 16 in such a way that fuel injector 1 is held closed by the contact pressure of valve-closure member 13 on valve-seat body 14. Restoring spring 16 is situated in a recess 17 of armature 9 or tubular support 8 and is prestressed by an adjusting sleeve 18.

On the inflow side of adjusting sleeve 18, a cup-shaped filter element 19 is pressed into valve sleeve 7. Filter element 19 is provided with a brass ring 20, which allows reliable support of filter element 19 in fuel injector 1.

The fuel supplied by a central fuel supply 22 flows through fuel injector 1, through recess 17 and flow-through orifices 11, to the sealing seat and to spray-discharge orifice 15.

If an electric current is provided to magnetic coil 2 via an electrical line (not shown further) and contact tag 6, a magnetic field is generated that, if sufficiently strong, pulls armature 9 into magnetic coil 2, counter to the force of restoring spring 16 and counter to the flow direction of the fuel. This closes a working gap 23 formed between armature 9 and tubular support 8. The movement of armature 9 also carries along, in the lift direction, valve needle 10, which is formed in one piece with armature 9, so that valve-closure member 13 lifts off from valve-seat body 14 and fuel is guided to spray-discharge orifice 15.

Fuel injector 1 is closed as soon as the electric current energizing magnetic coil 2 is switched off and the magnetic field has decayed to such a degree that restoring spring 16 presses armature 9 away from tubular support 8, thereby moving valve needle 10 in the flow-off direction, and causing valve-closure member 13 to set down on valve-seat body 14.

Figure 1B:
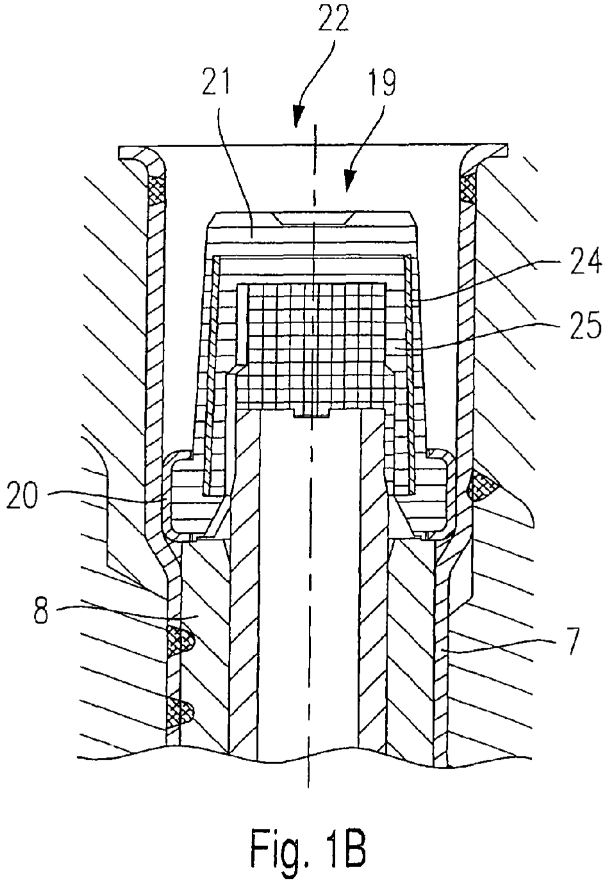
Fig. 1B Prior Art
FIG. 1B shows a schematic cut-away view of region IB of the fuel injector shown in FIG. 1A.

FIG. 1B, in a part-sectional view, shows a cut-away view of region IB of fuel injector 1 illustrated in FIG. 1A. Identical components are identified with matching reference numerals. A repetitious description of already discussed components are omitted.

As already mentioned earlier, filter element 19 has the form of a cup and is made up of a filter 21, which may be made from a cloth material 24, and a brass ring 20 for fixating filter element 19 in fuel injector 1. During the production, brass ring 20 is inserted in a molding die and, together with actual filter 21, is provided with a glass fiber plastic extrusion coat 25. Brass ring 20 is configured as deep-drawn component. Brass ring 20 and the complex sealing of the molding die cause high production costs of filter element 19 with brass ring 20.

Figure 2A:
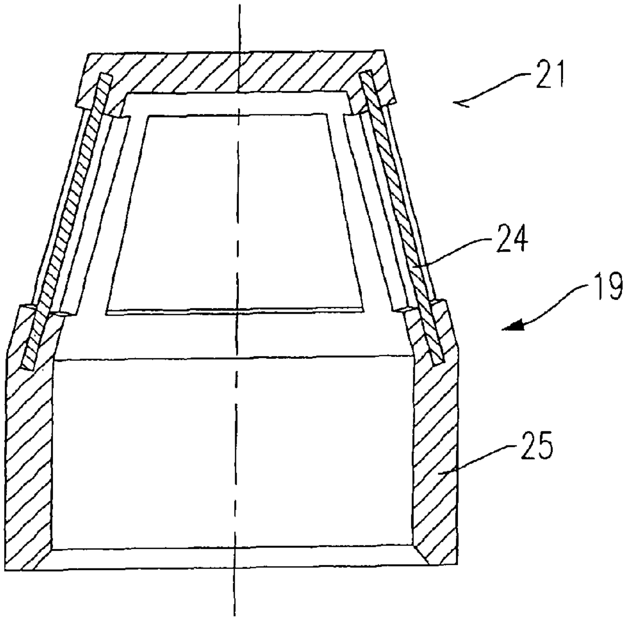
FIG. 2A shows a schematic representation of an exemplary embodiment of a filter element for a fuel injector configured according to the present invention.
Figure 2B:
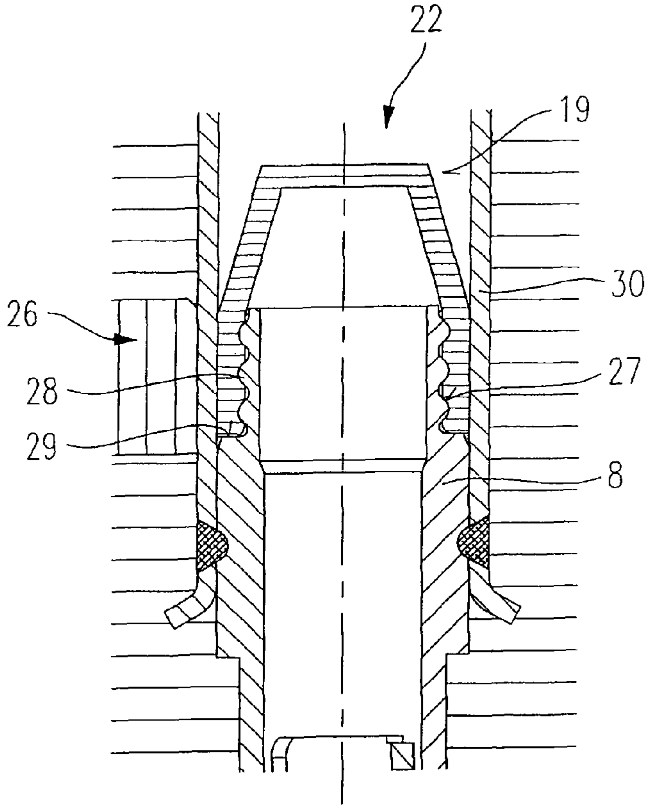
FIG. 2B shows a schematic cut-away view of a fuel injector configured according to the present invention, having a filter element according to FIG. 2A.

In contrast, a fuel injector 1 configured according to the present invention is provided with a filter element 19 according to FIGS. 2A and 2B, which filter element is fixated directly on inner pole 8 of fuel injector 1, without the aid of a brass ring 20.

FIG. 2A, in a schematic sectional view, shows an exemplary embodiment of a filter element 19, which is suitable for use in a fuel injector 1 configured according to the present invention. Filter element 19 has the shape of a cup. It is made of a cloth material 24, which is provided with a fiber glass plastic extrusion coat 25.

However, according to the present invention, as illustrated in FIG. 2B, filter element 19 is mounted on tubular support 8, acting as inner pole, of fuel injector 1. At an inflow-side end 26 of tubular support 8, grooves 27 are provided in an outer contour 28 of tubular support 8, which grooves are able to be produced in a simple manner by machine-cutting or with the aid of a structural steel. Filter element 19 is slipped onto these grooves 27 in the region of glass fiber plastic extrusion coat 25. Filter element 19 rests against a shoulder 29 of tubular support 8. Slipped-on filter element 19 has a slightly larger diameter than tubular support 8.

If an extension sleeve 30 is subsequently installed on tubular support 8, which is used for the connection to a fuel-distributor line (not shown further), the outer diameter of filter element 19 is calibrated to the inner diameter of extension sleeve 30, which is slightly smaller than the outer diameter of filter element 19. This presses filter element 19 into grooves 27 of tubular support 8 in the region of glass fiber plastic extrusion coat 25. A secure holding of the filter element in fuel injector 1 is ensured in this manner even with high temperature fluctuations. As a result of the measures according to the present invention, fuel injector 1 is able to be manufactured in a simple and more cost-effective manner because brass ring 20 is not required, without higher costs of other components.

The present invention is not limited to the exemplary embodiment represented and is suitable for other designs of fuel injectors 1, e.g., for fuel injectors 1 for direct injection or fuel injectors 1 connected to a common-rail system.

What is claimed is:

1. A fuel injector for a fuel-injection system of an internal combustion engine, comprising:

a solenoid coil;

a tubular support acting as an inner pole of the solenoid coil; and a filter element affixed on an outer contour of the tubular support, the filter element including a glass fiber plastic extrusion coat;

wherein the outer contour of the tubular support includes grooves having an undulating cross section;

wherein the filter element is configured to be affixed to the outer contour of the tubular support by radially compressing the glass fiber plastic extrusion coat of the filter element into the grooves;

wherein the tubular support includes a shoulder on a discharge side of the grooves; and wherein the shoulder extends radially outward beyond outer edges of the grooves.

2. The fuel injector as recited in claim 1, wherein the grooves are provided in the outer contour of the tubular support by one of machine cutting and with the aid of a form steel.

3. The fuel injector as recited in claim 1, wherein the filter element rests against the shoulder.

4. The fuel injector as recited in claim 1, further comprising:

an extension sleeve surrounding the exterior of the filter element, wherein the extension sleeve has an inner diameter that is slightly smaller than an outer diameter of the filter element, whereby a press-fit between the filter element and the tubular support is achieved by the extension sleeve.

5. The fuel injector as recited in claim 3, further comprising:

an extension sleeve surrounding the exterior of the filter element, wherein the extension sleeve has an inner diameter that is slightly smaller than an outer diameter of the filter element, whereby a press-fit between the filter element and the tubular support is achieved by the extension sleeve.

6. The fuel injector as recited in claim 1, wherein the filter element includes a cup-shaped filter made of a cloth material and the glass fiber plastic extrusion coat.

7. The fuel injector as recited in claim 3, wherein the filter element includes a cup-shaped filter made of a cloth material and the glass fiber plastic extrusion coat.

8. The fuel injector as recited in claim 4, wherein the filter element includes a cup-shaped filter made of a cloth material and the glass fiber plastic extrusion coat.

9. The fuel injector as recited in claim 5, wherein the filter element includes a cup-shaped filter made of a cloth material and the glass fiber plastic extrusion coat.

10. A method for installing a fuel injector for a fuel-injection system of an internal combustion engine, the fuel injector having a solenoid coil, a tubular support acting as an inner pole of the solenoid coil, and a filter element affixed on an outer contour of the tubular support, the method comprising the steps of:

producing the filter element, the filter element including a cup-shaped filter having a cloth material;

extrusion-coating the filter element with a glass fiber plastic extrusion coat;

providing grooves having an undulating cross section in the outer contour of the tubular support, the tubular support including a shoulder on a discharge side of the grooves, and the shoulder extending radially outward beyond outer edges of the grooves;

mounting the filter element onto the outer contour of the tubular support;

mounting an extension sleeve on an outer contour of the filter element, an inner diameter of the extension sleeve being slightly smaller than an outer diameter of the filter element; and radially compressing the glass fiber plastic extrusion coat of the filter element into the grooves in the outer contour of the tubular support, using mounting pressure applied by the extension sleeve.

* * * * *